United States Patent Office 3,440,240
Patented Apr. 22, 1969

3,440,240
REACTIVE AZO-DYESTUFFS
Rudolf Kühne and Fritz Meininger, Frankfurt am Main, and Heinrich Frölich, Kelkheim, Taunus, Germany, assignors to Farbwerke Hoechst Aktiengesellschaft vormals Meister Lucius & Bruning, Frankfurt am Main, Germany, a corporation of Germany
No Drawing. Filed June 9, 1964, Ser. No. 373,863
Claims priority, application Germany, June 10, 1963, F 39,951
Int. Cl. C09b 62/00, 29/24, 31/02
U.S. Cl. 260—187                                   6 Claims

ABSTRACT OF THE DISCLOSURE

Water-soluble reactive azo dyestuffs containing as reactive groupings one of the groups —CH=CH$_2$, —CH$_2$—CH$_2$Cl

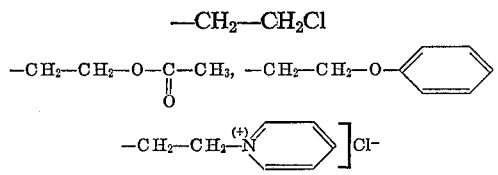

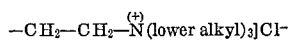

or

—CH$_2$—CH$_2$—$\overset{(+)}{N}$(lower alkyl)$_3$]Cl$^-$ which are suitable for the dyeing or printing of native and regenerated cellulose fibres, wool, silk, polyamide, polyacrylonitrile, aromatic polyester or cellulose acetate fibres or leather.

---

The present invention relates to novel mono- and disazo- dyestuffs having reactive groups and to a process for preparing them; more particularly it relates to mono- and disazo- dyestuffs of the following general Formula 1

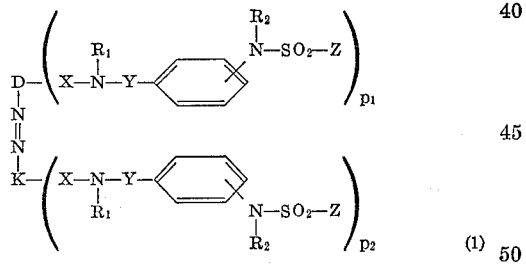

wherein D represents a diazo component selected from the group consisting of radicals of the benzene, naphthalene, stilbene, azobenzene, azonaphthalene, phenylazonaphthalene, diphenyl and diphenyl ether series, containing at the carbon atoms of the aromatic nuclei members selected from the group consisting of hydrogen, amino, nitro, lower alkyl, carboxyl, acetylamino and sulfonic acid group, K represents a coupling component selected from the group consisting of radicals of the benzene, naphthalene and pyrazolone series, containing at the carbon atoms of the aromatic nuclei members selected from the group consisting of hydrogen, lower alkyl, lower alkoxy, hydroxyl, sulfonic acid group, acetylamino, benzoylamino, carboxyl, chlorine, —NH—CO—CH=CH$_2$ and

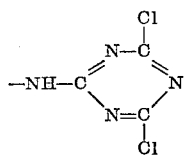

X represents a member selected from the group consisting of a direct linkage, lower alkylene,

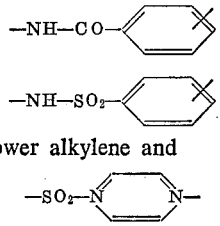

—SO$_2$—NH— lower alkylene and

R$_1$ represents a member selected from the group consisting of hydrogen and lower alkyl, Y represents a member selected from the group consisting of —CO—, —SO$_2$— and —CO—NH—, R$_2$ represents a member selected from the group consisting of hydrogen, lower alkyl and —CH$_2$—CH$_2$—Cl p$_1$ and p$_2$ represents members from 0 to 1, the sum of p$_1$ and p$_2$ being at least 1, and Z represents a member selected from the group consisting of —CH=CH$_2$, —SO$_2$—CH$_2$—CH$_2$—Cl

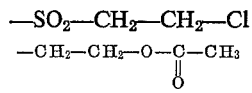

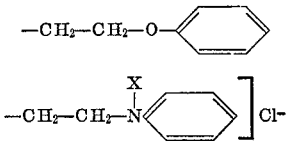

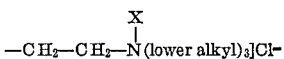

and

—CH$_2$—CH$_2$—$\overset{|}{N}$(lower alkyl)$_3$]Cl$^-$

We have found that new valuable mono- and disazo-dyestuffs of the above general Formula 1 which contain reactive groups, can be prepared by reacting acylable mono- or disazo- dyestuffs of the general Formula 2

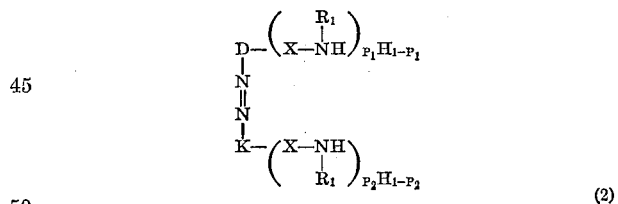

wherein D, K, X, R$_1$ and P$_1$ and P$_2$ have the meanings given above, with about 1–2 mols of a compound of the general Formula 3

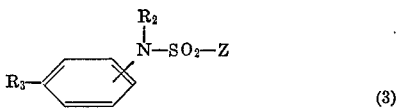

in which R$_2$ and Z have the meanings given above, and R$_3$ represents a carboxylic acid halide group, a sulfonic acid halide group or an isocyanate group, at temperatures in the range of about 0° to 40° C., within a pH range of about 3 to 9. The acylable amino groups

of the starting dyestuffs of the above general Formula 2 may be linked with an aromatic nucleus of the azo-dyestuff molecule, either directly or via an alkylene group, for example, a methylene, ethylene, propylene, isopropylene, or butylene group; the alkylene group itself may be linked over a bridging member with the respective aromatic nucleus of the azo-dyestuff molecule. Bridging members of the last mentioned type may be, for example,

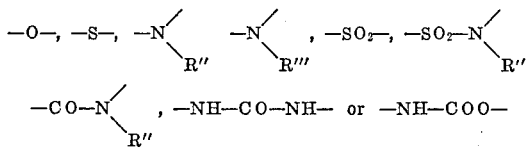

in which formulae R″ represents a hydrogen atom or an alkyl, hydroxyalkyl, cycloalkyl, aryl or aralkyl radical, and R‴ represents an acyl radical.

As radicals Z in the above general Formula 3, there enters into consideration all those radicals which are split off by the action of agents having an alkaline action under formation of a vinylsulfonylamino group. Such radicals are, for example, mineral or organic acid radicals, for example, halogen atoms such as chlorine or bromine atoms, furthermore sulfuric acid ester groups, alkylsulfonic acid ester groups or arylsulfonic acid ester groups, acyloxy groups such as the acetoxy group, furthermore the phenoxy group or dialkylamino groups such as the dimethylamino group or the diethylamino group, and finally, quarternated amino groups such as the trimethylammonium group or the triethylammonium group or the pyridinium group.

As acylable starting dyestuffs of the general Formula 2, there may be used monoazo- and disazo-dyestuffs and in particular water-soluble dyestuffs of these classes which contain in the dyestuff molecule at least one acylable amino group or at least one group which is convertible into an acylable amino group. Substituents which are convertible into acylable amino groups are, for example, nitro groups or acylamino groups, which can be converted into amino groups by reduction or saponification.

As the groups imparting solubility in water, the starting dyestuffs contain especially sulfonic acid groups; however, they may also contain carboxylic acid groups and sulfonic acid amide groups or, for example, acylated sulfonic acid amide groups such as alkyl- or aryldisulfimide and alkyl- or arylcarbonylsulfimide groups, furthermore, phosphonic acid or sulfuric acid ester groups. Preferably, the starting dyestuffs contain several groups imparting solubility in water, which may be identical or different from one another.

In order to illustrate the process of the present invention, some of the various suitable starting dyestuffs of the azo class and disazo class are hereinafter described schematically and by way of example.

In the general formulae of the dyestuff groups dealt with in detail hereinafter, R represents a hydrogen atom or a lower alkyl radical.

(1) Monoazo-dyestuffs of the general formula

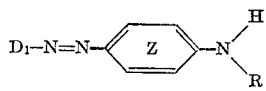

in which $D_1$ represents a bicyclic aryl radical, especially a naphthalene or stilbene radical containing sulfonic acid groups and the benzene nucleus Z may also carry further substituents, for example, halogen atoms, alkyl, alkoxy, carboxylic acid or acylamino groups.

(2) Monoazo-dyestuffs of the general formula

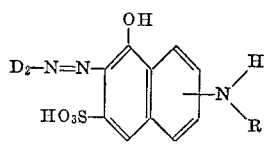

wherein the group

is bound in one of the two positions indicated, and $D_2$ represents a mono- or bi-cyclic aryl radical, for example, a benzene, naphthalene, diphenyl, stilbene, benzthiazolylphenyl or diphenyl-amino group. The radical $D_2$ may also contain further substituents, for example, halogen atoms, alkyl groups such as methyl groups, or acylamino groups or alkoxy groups, especially sulfonic acid groups.

(3) Monoazo-dyestuffs of the general formula

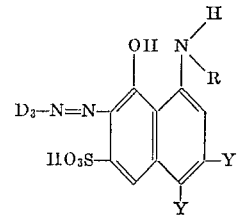

wherein one Y represents a hydrogen atom and the other Y represents a sulfonic acid group, and $D_3$ represents a mono- or bi-cyclic radical of a diazo component which, preferably, may contain sulfonic acid groups.

(4) Disazo-dyestuffs of the general formula indicated under (2) or (3), wherein $D_2$ or $D_3$ represents a radical containing azo groups, for example, an azobenzene radical, an azonaphthalene or phenylazonaphthalene radical, which are substituted especially by sulfonic acid groups.

(5) Mono- and disazo-dyestuffs of the general formula

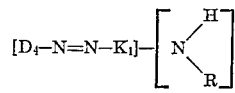

wherein $D_4$ represents a radical of the benzene, naphthalene, azobenzene, azonaphthalene or phenylazonaphthalene series, and $K_1$ represents the radical of an azo component of the benzene, naphthylamine, acetoacetic acid arylide or pyrazolone series and wherein the group

may be contained in the diazo or in the azo component.

(6) Mono- and disazo-dyestuffs of the general formula

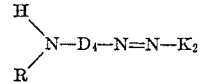

wherein $D_4$ has the meaning given under (5) and $K_2$ represents the radical of an azo component of the naphthol series.

The reaction of the water-soluble starting dyestuffs of the general Formula 2 with the acid halides or isocyanates of the Formula 3 is preferably carried out in water. The acid chlorides or isocyanates may be used either in concentrated form, if desired or required with preceding, simultaneous or subsequent addition of a substance having emulsifying action or a surfactant for better distribution in the aqueous phase, or dissolved in an organic solvent. Solvents which are suitable for this purpose are, for example, acetone, chloroform, benzene, toluene or chlorobenzene.

The reaction temperature is determined by the reactivity of the starting substances. Generally, the starting dyestuffs can be reacted with sufficient speed at a temperature in the range from 0° to 40° C., preferably from 0° to 5° C., with the condensing agents. Reaction temperatures below 0° C. and above 40° C. in principle also can be used, but then the reaction times are correspondingly longer or the yields smaller.

The reaction is carried out in a weakly acid, neutral or weakly alkaline medium at pH-values ranging from about 3 to 9.

The hydrohalic acid that is formed when using the mentioned acid halides is neutralized by the presence of or by gradual addition of agents binding mineral acid, for example, sodium acetate, sodium formate, sodium or potassium carbonate or sodium or potassium bicarbonate, which are used either in solid form or in the form of aqueous solutions. The reaction of the starting dye-stuffs with the isocyanate compounds is carried out in the neutral or weakly alkaline pH range, if desired or required in the presence of buffer salt mixtures.

When the condensation reaction is complete, the water-soluble dyestuffs are precipitated, if desired after previous neutralization, from the solutions or suspensions, filtered, washed and dried.

The dyestuffs obtainable by the process of the present invention may also be prepared by reacting the starting dyestuffs of the aforesaid type, particularly those which are water-insoluble, with the acid halides or isocyanates of the Formula 3 in an inert organic solvent. If desired or necessary, these reactions are carried out in the presence of or while adding acid-binding agents. Solvents which are suitable for this purpose are, for example, benzene, toluene, chlorobenzene, nitrobenzene, tetrahydrofurane, acetone, dimethylformamide or dimethylacetamide.

The acid halides or isocyanate compounds of the Formula 3 used in accordance with the present invention for preparing the dyestuffs, constitute novel compounds.

The acid halides of the Formula 3 can be prepared, for example:

(a) By reacting aminobenzenecarboxylic acids or- sulfonic acids with acylating agents which introduce the radical of the vinylsulfonic acid, for example, with carbyl sulfate or vinylsulfonic acid chloride, or (b) By allowing, for example, acetic acid anhydride, methanesulfonic acid chloride or p-toluenesulfonic acid chloride to act on isothionylaminobenzene-carboxylic acids or -sulfonic acids, whereby the hydroxyl group in $\beta$-position is esterified, or (c) By allowing vinylsulfonylaminobenzenecarboxylic acids or -sulfonic acids to react with, for example, phenols or dialkylamines, whereby the corresponding $\beta$-phenoxy- or $\beta$-dialkylamino compounds are formed which themselves may be converted into quaternary ammonium compounds by the reaction with alkylating agents such as methyl chloride or dimethyl sulfate.

The benzenecarboxylic acid or benzenesulfonic acid derivatives obtained by the methods described under (a), (b) and (c) may be alkylated, if desired, at the nitrogen atom bound to an aromatic nucleus, with an alkylating agent such as dimethyl sulfate or diethyl sulfate and then converted in known manner into the corresponding carboxylic acid or sulfonic acid halides.

The sulfonic acid chlorides of the Formulas 4 or 5 may also be prepared from aniline derivatives of the formula

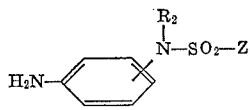

by diazotizing these compounds and subsequently reacting the diazonium salts thus obtained with sulfur dioxide in the presence of acetic acid and copper chloride according to a process described by H. Meerwein (B. 90, 841, 1957).

The isocyanate compounds of the Formula 3 can be prepared by reacting in known manner the afore-mentioned aniline derivatives with phosgene, whereby an isocyanate group is formed from the amino group. As examples of such starting compounds, which are prepared in the manner described above and may be used in accordance with the process of the present invention, there may be mentioned the following compounds:

2-(N-methyl-$\beta$-chloroethylsulfonylamino)-benzene-1-carboxylic acid chloride,
2-($\beta$-chloroethylsulfonylamino)-benzene-1-carboxylic acid chloride,
4-(N-methyl-$\beta$-chloroethylsulfonylamino)-benzene-1-carboxylic acid chloride,
3-(N-methyl-$\beta$-chloroethylsulfonylamino)-benzene-1-carboxylic acid chloride,
2-(N-ethyl-$\beta$-chloroethyl-sulfonylamino)-benzene-1-carboxylic acid chloride,
4-(N-butyl-$\beta$-chloroethylsulfonylamino)-benzene-1-carboxylic acid chloride,
4-(N-methylvinylsulfonylamino)-benzene-1-carboxylic acid chloride or -sulfonic acid chloride,
3-(N-methyl-vinyl-sulfonylamino)-benzene-1-sulfonic acid chloride,
4-(N-methyl-$\beta$-chloroethyl-sulfonylamino)-3-chloro-benzene-1-carboxylic acid chloride,
4-$\beta$-chloroethylsulfonylamino-benzene-1-carboxylic acid chloride,
4-(N-methyl-vinylsulfonylamino)-2,5-dimethylbenzene-1-isocyanate,
4-(N-methyl-$\beta$-chloroethylsulfonylamino)-benzene-1-isocyanate,
3-(N-methyl-vinyl-sulfonylamino)-benzene-1-isocyanate,
4-(N-methyl-$\beta$-chloroethylsulfonylamino)-3-methoxy-benzene-1-isocyanate,
4-(N-methyl-$\beta$-chloroethylsulfonylamino)-3-methoxy-2-methylbenzene-1-isocyanate,
3-(N-methyl-$\beta$-chloroethylsulfonylamino-4-chloro-benzene-1-isocyanate,
4-(N-methyl-$\beta$-trimethylammonium chloride,ethylsulfonylamino)-benzene-1-carboxylic acid chloride,
4-(N-methyl-$\beta$-pyridinium chloride-ethylsulfonylamino)-benzene-1-carboxylic acid chloride,
4-(N-methyl-$\beta$-bromoethyl-sulfonylamino)-benzene-1-carboxylic acid bromide,
4-(N-methyl-$\beta$-acetoxy-ethylsulfonylamino)-benzene-1-carboxylic acid or sulfonic acid chloride,
4-(N-methyl-$\beta$-phenoxy-ethylsulfonylamino)-benzene-1-carboxylic acid chloride, furthermore $\beta$ - hydroxy-ethylsulfonyl-amino-benzene-carboxylic acid chlorides, -sulfonic acid chlorides or -isocyanates whose hydroxy group in $\beta$-position is esterified, for example, with methane-sulfonic acid, benzenesulfonic acid or p-toluenesulfonic acid, thus, for example, the methanesulfonic acid ester of 3-(N-methyl-$\beta$-hydroxy-ethylsulfonylamino)-benzene-1-carboxylic acid chloride or the p-toluenesulfonic acid ester of 4-(N-ethyl-$\beta$-hydroxy-ethylsulfonylamino)-benzene-1-isocyanate.

The dyestuffs obtainable by the process of the present invention may contain any substituents in the dyestuff molecule, for example, sulfonic acid, carboxylic acid, sulfonamide, sulfone, acylamino, arylamino, nitro, cyano, hydraoxy, alkoxy, or azo-groups or halogen atoms. Depending on the nature of their substituents, the dyestuffs obtained are thus insoluble in water, sparingly soluble, preferably, however, easily soluble in water. In addition to these substituents, the dyestuff radical may also carry reactive groupings, for example, mono- or dihalogeno-triazinylamino groups, di- or trichloropyrimidylamino groups, furthermore hydroxyalkylamide- or hydroxyalkylsulfone groups esterified with sulfuric acid, furthermore, halogenoacylamino, urethane, halogenoalkyl, epoxide and isothiocyanate groups.

The monoazo-dyestuffs and disazo-dyestuffs obtained by the process of the present invention are suitable, depending on their nature, for the dyeing or printing of various natural, regenerated or synthetic fibrous materials such as cotton, viscose, regenerated cellulose, wool, silk, leather, polyamides, polyacrylonitrile, cellulose acetate or aromatic polyester fibers. For these purposes, the dyestuffs of the invention may be used according to the dyeing and printing methods conventionally used in the industry, as illustrated hereinafter.

The use of the dyestuffs obtainable by the process of the present invention depends in the first instance on the fibrous material to be dyed and on the constitution of the dyestuff to be employed, in particular on the number and nature of the groups present which impart solubility in water. For example, those of the novel dyestuffs which preferably contain more than one group imparting solubility in water, for example, two or more sulfonic acid and/or carboxylic acid groups in the molecule, are especially suitable for the dyeing of cellulose-containing materials, particularly of cotton.

The fixation of the novel dyestuffs on the cellulose-containing fibrous materials dyed according to the usual dyeing or printing methods is carried out by a treatment with an acid-binding agent, for example, sodium or potassium hydroxide, sodium or potassium carbonate, sodium or potassium bicarbonate, sodium silicate, sodium triphosphate or sodium trichloroacetate and, if desired, by the action of heat. The treatment with the acid-binding agent can be carried out prior to, during or after the application of the dyestuff.

Thus, for example, cellulose-containing textile materials can be dyed according to the so-called direct dyeing method, by treating the textile materials with an aqueous solution of the dyestuff in the presence of acid-binding agents at a temperature in the range of, for example, 40° and 100° C.

For preparing dyeings, one may also apply the dyestuff to the cellulose-containing textile material according to the usual dyeing and padding methods and then introduce the goods dyed into an aqueous solution of the acid-binding agent at a temperature in the range of 20° and 100° C.

Furthermore, the novel dyestuffs may be applied, for example, by padding or from a dye-bath at a temperature ranging from 20° to 100° C., to the textile material impregnated with an aqueous solution of the acid-binding agent, and heating, if desired, after intermediate drying.

Furthermore, the textile material may be treated with an aqueous solution of the dyestuff in the presence of the acid-binding agent, squeezed and then allowed to remain at room temperature or heated for a short period, for example, by steaming, if desired, after an intermediate drying.

The aqueous dyestuff solutions used for preparing the dyeings may be combined with other substances; thus, there may be added above all electrolytes such as sodium chloride or sodium sulfate, urea, dispersing agents, surfactants and thickeners, for example, sodium alginate.

The novel dyestuffs are also suitable for the preparation of prints on cellulose materials. For this purpose, the fabric is printed with a printing paste containing the acid-binding agent and subjected to a short heat treatment, if desired, after intermediate drying. It is also possible to apply a printing paste containing one or several of the dyestuffs obtainable by the process of the invention to the cellulose fabric impregnated with an acid-binding agent, and subsequently to heat the printed fabric, for example, by steaming. Furthermore, the cellulose materials may first be printed with a printing paste containing one or several dyestuffs, and then treated with the aqueous solution of acid-binding agents, preferably in the presence of electrolytes such as sodium chloride or sodium sulfate, at a temperature in the range from about 60° to 100° C. The printing pastes used for preparing the prints may also contain further substances, for example, urea, thickeners, water-in-oil emulsions, surfactants and m-nitrobenzenesulfonic sodium. The dyeings and prints on cellulose prepared with the novel dyestuffs are generally rinsed after the dyeing or printing process with water, then soaped and rinsed again with water before drying.

The mono- and disazo-dyestuffs of the invention, which contain no groups imparting solubility in water such, for example, as sulfonic acid, carboxylic acid or sulfonic acid amide groups, are expediently used in the form of aqueous dispersions for the dyeing of textile materials. Such dispersions can be obtained in the usual manner, for example, by grinding the dyestuffs of the invention with a dispersing agent in water.

Finally, the novel dyestuffs may also be used for the dyeing of nitrogen-containing textile materials, for example, wool and polyamide fibers. The dyeing is carried out from weakly alkaline, neutral or acid dyebaths in the presence of compounds conventionally used for the dyeing of nitrogen-containing textile materials, for example, sodium sulfate, ammonium acetate, surfactants such as quaternary ammonium salts, and non-ionic dispersing agents. If desired, the pH value of the dyebath may be varied during the dyeing process by adding alkalies or alkaline salts or by adding acids or acid salts, for example, in such a manner as to start the dyeing at a pH value of 4 and increasing the pH value during the dyeing to 7.5.

The novel dyestuffs give in general full and clear shades which are distinguished by good properties of fastness, especially by good to very good fastness to light and wet processing.

The following examples illustrate the invention but they are not intended to limit it thereto:

Example 1

34.7 parts by weight of the di-sodium salt of 2-aminonaphthalene-4,8-disulfonic acid are dissolved in 200 parts by volume of water and 25 parts by volume of concentrated hydrochloric acid are added. The whole is then cooled to 0° to 5° C. and diazotized with a 5 N sodium nitrite solution. The suspension of the diazonium salt thus obtained is then allowed to run, at 10° to 15° C., into a neutralized solution of 25 parts of weight by 2-amino-5-hydroxynaphthalene-7-sulfonic acid, while maintaining the pH value at 8 to 8.5 by simultaneously adding sodium carbonate. When the coupling is complete, the aminoazo-dyestuff is salted out with potassium chloride, filtered off and washed with a potassium chloride solution.

The aminoazo-dyestuff is dissolved in 510 parts by volume of water. A solution of 32.6 parts by weight of 4 - (N - methyl - $\beta$ -chloroethylsulfonylamino)-benzene-1-carboxylic acid chloride (melting point 55–60° C.) in 50 parts by volume of acetone is then added dropwise at 0° to 5° C., in the course of 1 hour, while stirring vigorously. By simultaneous dropwise addition of a sodium carbonate solution having a strength of 10 percent by weight, the pH value of the mixture is kept at 6 to 6.5, until the reaction is complete. The precipitated dyestuff is dissolved by heating the suspension obtained, filtered and salted out with potassium chloride. After filtration and drying, there is obtained a red orange powder which dissolves easily in water to give a red orange solution.

20 parts by weight of the dyestuff obtained together with 50 parts by weight of urea are dissolved in 200 parts by weight of hot water. To the solution thus obtained, there are added, while stirring, 400 parts by weight of an aqueous, alkali-resistant alginate thickening having a strength of 8 percent by weight and 20 parts by weight of sodium carbonate. By adding water and thickening, the whole is made up to 1000 parts by weight. A cellulose fabric is printed with the printing paste obtained. The fixation of the dyestuff is carried out by steaming for 5 minutes at 100° to 102° C. After soaping at the boiling temperature and rinsing, there is obtained a vivid red orange print having a good fastness to washing and to light.

Example 2

34.7 parts by weight of the di-sodium salt of 2-aminonaphthalene-4,8-disulfonic acid are diazotized as described in Example 1. A solution of 3-amino-1-methylbenzene in 165 parts by volume of water and 11 parts by volume of concentrated hydrochloric acid are allowed to run into the suspension of the diazonium compound obtained. The pH value is adjusted to 3 to 3.5 by adding sodium carbonate and kept at this value until coupling is complete. The aminoazo-dyestuff formed is salted out with sodium chloride, filtered and dried.

20.5 parts by weight of the aminoazo-dyestuff obtained having the formula

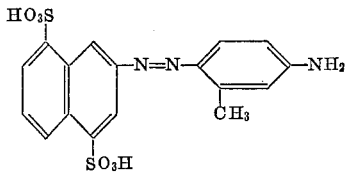

are dissolved in 300 parts by volume of water. A solution of 14 parts by weight of 4-(N-methyl-β-chloroethyl-sulfonylamino)-benzene-1-isocyanate (colorless oil), having a boiling point of 175° C. at 0.15 mm. Hg, in 40 parts by weight of acetone is allowed to run into the intensely stirred solution, at 0°–5° C., in the course of 1 hour. The whole is then further stirred for 2 hours at 0° C. When the reaction is complete, the dyestuff formed is salted out by the addition of sodium chloride, filtered off and dried. An orange yellow powder is obtained, which gives, when dyed on cotton according to the process described hereafter, a reddish yellow which is fast to washing and to light.

A mercerized cotton fabric is impregnated with a dyestuff solution containing 20 parts by weight of the dyestuff prepared in 1000 parts by volume of water. After the impregnation, the fabric is squeezed to have a liquid absorption of 80%, dried and treated at room temperature with an alkaline salt solution containing per liter 250 g. of sodium chloride and 10 g. of sodium hydroxide. After squeezing, the fabric is steamed for 30 seconds at 100° to 102° C., acidified, rinsed at boiling temperature and dried. A full reddish yellow dyeing having good fastness to boiling and to light is obtained.

Example 3

41.4 parts by weight of the azo-dyestuff of the formula

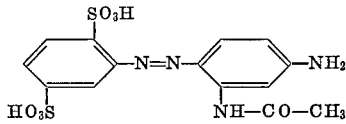

are dissolved in 1470 parts by volume of water while adding sodium carbonate so that a neutral solution is formed. 30 parts by weight of 4-(N-methyl-vinylsulfonylamino)-benzene-1-sulfonic acid chloride (melting point 74° to 75° C.), dissolved in 110 parts by volume of acetone, are added dropwise, in the course of one hour at 30° to 40° C. and, simultaneously, a dilute aqueous sodium bicarbonate solution is added dropwise in such a manner that the pH-value is kept at 6.5 to 7. When the reaction is complete, the dyestuff of the formula

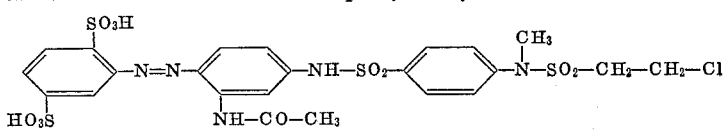

is salted out by the addition of sodium chloride, filtered off and dried at 50° C. to 60° C. in the vacuum. A yellow powder is obtained which dissolves in water to give a yellow solution. In the presence of sodium carbonate, the dyestuffs give a clear yellow print on cotton which is fast to light and to washing.

In the following table, other starting dyestuffs are listed which can be converted with the condensing agents indicated in the second column into the corresponding new dyestuffs. In the third column are indicated the tints obtained when using the dyestuffs obtained according to the invention for the dyeing or printing of cellulose-containing fabrics in the presence of an acid-binding agent.

| Aminoazo-dyestuff | Condensing agent | Tint on cotton |
|---|---|---|
| 2-aminonaphthalene-4,8-disulfonic acid ⟶ 1-amino 2,5-dimethoxybenzene. | 4-(N-methyl-β-chloroethyl-sulfonylamino)-benzene-1-carboxylic acid chloride. | Orange. |
| 2-aminonaphthalene-4,8-disulfonic acid ⟶ 1-aminobenzene. | ____do____ | Yellow. |
| 1-aminonaphthalene-3,6-disulfonic acid ⟶ 1-amino-3-methylbenzene. | ____do____ | Do. |
| 2-aminonaphthalene-3,6-disulfonic acid ⟶ 1-amino-3-methylbenzene. | 4-(N-ethyl-β-chloroethyl-sulfonylamino)-benzene-1-carboxylic acid chloride. | Do. |
| 2-aminonaphthalene-5,7-disulfonic acid ⟶ 1-amino-3-ethoxybenzene. | 4-(N-butyl-β-chloroethyl-sulfonylamino)-benzene-1-carboxylic acid chloride. | Do. |
| 1-aminonaphthalene-3,6,8-trisulfonic acid ⟶ 1-amino-3-methylbenzene. | 4-(N-methyl-β-chloroethyl-sulfonylamino)-benzene-1-carboxylic acid chloride. | Do. |
| 2-aminonaphthalene-4,8-disulfonic acid ⟶ 1-amino-3-acetylaminobenzene. | ____do____ | Do. |
| 2-aminonaphthalene-6,8-di-disulfonic acid ⟶ 1-amino-3-methylbenzene. | ____do____ | Do. |
| 4-aminoazobenzene-3,4'-disulfonic acid ⟶ 1-amino-3-methylbenzene. | ____do____ | Brownish yellow. |
| 2-(3'-sulfo-4'-aminophenyl)-6-methylbenzthiazol-7-sulfonic acid ⟶ 1-amino-3-methylbenzene. | ____do____ | Yellow. |
| 1-aminobenzene-2,4-disulfonic acid ⟶ 1-amino-3-methoxybenzene. | ____do____ | Do. |
| 1-aminobenzene-2,5-disulfonic acid ⟶ 1-amino-2-methoxy-5-methylbenzene. | 4-(N-methyl-vinylsulfonyl-amino)-1-sulfonic acid chloride. | Do. |
| 1-aminobenzene-2-carboxylic acid-5-sulfonic acid ⟶ 1-amino-2-methoxy-5-methylbenzene. | ____do____ | Do. |
| Mixture of 3-aminopyrene-5,8- and -5, 10-disulfonic acid ⟶ 1-amino-3-methylbenzene. | ____do____ | Yellow orange. |
| 4-nitro-4'-amino-stilbene-2,2'-disulfonic acid ⟶ N-methyl-aniline. | 4-(N-methyl-β-chloroethyl-sulfonylamino)-benzene-1-carboxylic acid chloride. | Do. |

Example 4

50.4 parts by weight of the aminomonoazo-dyestuff of the formula

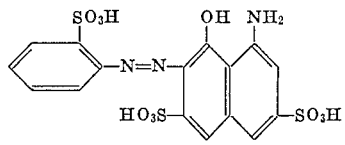

are dissolved in 500 parts by volume of water with the addition of dilute sodium hydroxide solution so that a neutral aqueous solution of the dyestuff is obtained. To this solution, there are added, dropwise at 0° to 5° C., in the course of one hour, 36 parts by weight of 4-(N-methyl-β-chloroethylsulfonylamino)-1-carboxylic acid chloride, dissolved in 60 parts by volume of acetone, simultaneously with an aqueous potassium carbonate solution, so that the pH-value of 6 to 6.5 is maintained. When the reaction is complete, the dyestuff solution is filtered and combined with potassium chloride. The dyestuff formed having the formula

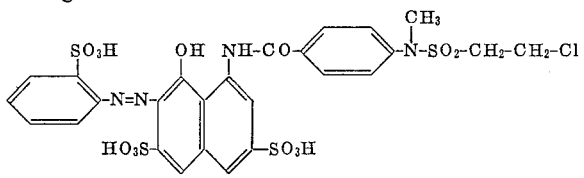

is filtered off, washed with dilute potassium chloride solution and dried at 60° C. A dark powder is obtained which dissolves in water to give a bluish red solution. When applied according to the printing method described in Example 1, the new dyestuff gives on cotton a brilliant bluish red print which has a good fastness to washing and to light.

Example 5

63 parts by weight of the aminomonoazo-dyestuff of the formula

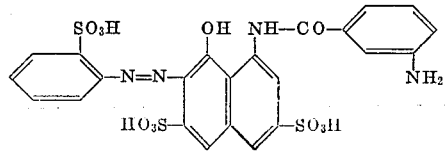

are dissolved in 1150 parts by volume of water with the addition of dilute sodium hydroxide solution so that an aqueous neutral solution of the dyestuff is obtained. To this solution, there are added dropwise, at 25° to 35° C., 33 parts by weight of 4-(N-methylvinylsulfonylamino)-benzene-1-sulfonic acid chloride (melting point 74° to 75° C.), dissolved in 100 parts by volume of acetone, and, simultaneously, an aqueous sodium carbonate solution in such a manner that the reaction mixture continuously shows a neutral reaction. As soon as the condensation is terminated, the dyestuff that has formed is salted out by introduction of sodium chloride, filtered off, washed with dilute sodium chloride solution and dried in a vacuum. The new dyestuff dissolves in water to give a blue red solution. 20 parts by weight of the dyestuff obtained and 5 parts by weight of sodium hydroxide are dissolved in 1000 parts by weight of water. A cotton fabric is impregnated at 20° C. with this dyebath. After the impregnation, the fabric is squeezed, wound on a roll and allowed to stand for 16 hours at 18° to 25° C. It is then acidified, rinsed in boiling water and dried. A uniform bluish red dyeing is obtained which is fast to boiling water. Dyestuffs having similar properties can be prepared by reacting the aminomonoazo-dyestuffs listed in the following table under corresponding reaction conditions with the acid chlorides or isocyanates listed in the second column. (The letter *a* above the arrows in the following table means "alkaline coupling.")

| Aminoazo-dyestuff | Condensing agent | Tint on cotton |
|---|---|---|
| 2-aminonaphthalene-1-sulfonic acid $\xrightarrow{a}$ 1-amino-8-hydroxynaphthalene-3,6-disulfonic acid. | 4-(N-methyl-β-chloroethyl-sulfonylamino)-benzene-1-carboxylic acid chloride. | Bluish red. |
| 1-aminobenzene-2,5-disulfonic acid $\xrightarrow{a}$ 2-amino-5-hydroxynaphthalene-7-sulfonic acid. | ....do.... | Orange. |
| 2-aminonaphthalene-4,8-disulfonic acid $\longrightarrow$ 2-(3′-aminobenzoylamino)-5-hydroxynaphthalene-7-sulfonic acid. | ....do.... | Red. |
| 1-amino-2-carboxybenzene-4-sulfonic acid $\xrightarrow{a}$ 1-amino-8-hydroxynaphthalene-3,6-disulfonic acid. | ....do.... | Red. |
| 1-amino-4-methylbenzene-2-sulfonic acid $\xrightarrow{a}$ 1-amino-8-hydroxynaphthalene-3,6-disulfonic acid. | ....do.... | Bluish red. |
| 1-aminobenzene-2-sulfonic acid $\longrightarrow$ 2-methylamino-naphthalene-5-hydroxy-7-sulfonic acid. | ....do.... | Orange. |
| 1-aminobenzene-2,5-disulfonic acid $\xrightarrow{a}$ 1-(3′-amino-benzoylamino)-8-hydroxynaphthalene-3,6-disulfonic acid. | 4-(N-methyl-vinyl-sulfonylamino)-benzene-1-sulfonic acid chloride. | Red. |
| 1-aminobenzene-2,5-disulfonic acid $\xrightarrow{a}$ 1-(3′-aminobenzoylamino)-8-hydroxynaphthalene-3,6-disulfonic acid. | 4-(N-methyl-β-chloroethyl-sulfonylamino)-benzene-1-isocyanate. | Red. |
| 1-aminobenzene-2,5-disulfonic acid $\xrightarrow{a}$ 1-(3′-amino-benzenesulfamino)-8-hydroxynaphthalene-3,6-disulfonic acid. | ....do.... | Red. |

Example 6

21 parts by weight of the dyestuff of the formula

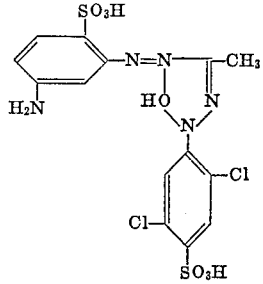

are dissolved in 675 parts by volume of water with the addition of sodium carbonate so that a neutral aqueous solution of the dyestuff is formed. To this solution, there is run in, at 0° to 5° C., while intensely stirring, in the course of one hour, a solution of 15 parts by weight of 4 - (N - methylvinylsulfonylamino)-benzene-1-carboxylic acid chloride in 30 parts by volume of acetone and, simultaneously, a dilute sodium hydroxide solution in a manner such that the pH-value is continuously kept at 6 to 6.5. Stirring is then continued until the reaction is complete. The dyestuff formed is then salted out with sodium chloride, filtered off and dried. The dyestuff dyes cotton and wool fast greenish yellow shades.

When using 17 parts by weight of 2-(N-methyl-β-chloroethylsulfonylamino) - benzene-1-carboxylic acid chloride instead of 4-(N-methylvinylsulfonylamino)-benzene-1-carboxylic acid chloride, a dyestuff having similar properties is obtained.

are dissolved in 700 parts by volume of water with the addition of sodium hydroxide solution so that a neutral aqueous solution of the dyestuff is obtained, and 40 parts by weight of crystallized sodium acetate are added. Into the mixture, there is slowly run in, while intensely stirring, at 0° to 5° C., a solution of 17 parts by weight of 4 - (N - methyl-β-chloroethylsulfonylamino)-benzene-1-carboxylic acid chloride in 30 parts by volume of acetone. When the acylation is complete, the reaction mixture is adjusted to a pH-value of 10, at 20° C., with dilute sodium hydroxide solution, stirred for 10 minutes and then neutralized with dilute hydrochloric acid. The dyestuff formed having the formula

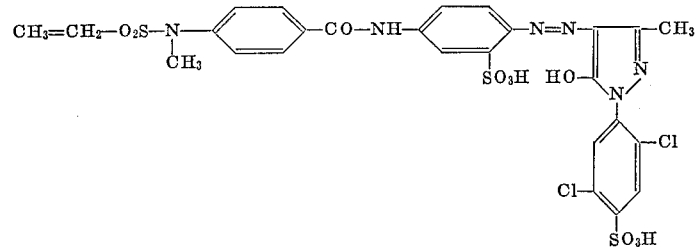

is finally precipitated with sodium chloride, filtered off and dried. A yellow powder, which dissolves in water to give a yellow solution and which dyes cotton and wool yellow shades, is obtained.

In the following table, further aminoazo-dyestuffs are listed which can be converted into dyestuffs with the respective condensing agents and which dye wool and cotton the shades indicated.

Example 7

21 parts by weight of the dyestuff of the formula

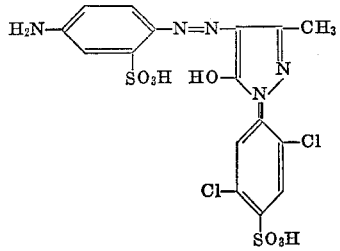

| Aminoazo-dyestuff | Condensing agent | Tint on wool or cotton |
| --- | --- | --- |
| HO₃S-⟨⟩-N=N-⟨⟩(HO₃S)-N=N-⟨⟩(NH-CO-CH=CH₂)-NH₂ | 4-(N-methyl-β-chloroethylsulfonylamino)-benzene-1-carboxylic acid chloride. | Yellow orange. |
| HO₃S-⟨naphthyl-SO₃H⟩-N=N-⟨naphthyl(OH)(HO₃S)⟩-NH₂ | ...do... | Reddish orange. |
| ⟨SO₃H-phenyl⟩-N=N-⟨pyrazole-COOH, N-phenyl-NH₂⟩ | ...do... | Greenish yellow |
| ⟨SO₃H, H₂N, H₂N-phenyl⟩-N=N-⟨pyrazole-CH₃, HO, NH⟩ | ...do... | Do. |

| Aminoazo-dyestuff | Condensing agent | Tint on wool or cotton |
|---|---|---|
| 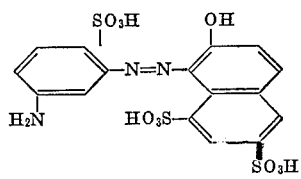 | 4-(N-methyl-β-chloroethylsulfonylamino)-benzene-1-carboxylic acid chloride. | Orange. |
| 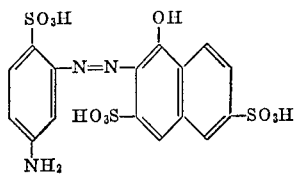 | 4-(N-methyl-vinylsulfonylamino)-benzene-1-sulfonic acid chloride. | Do. |
| 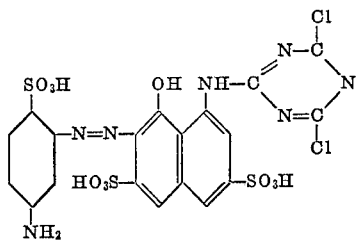 | ......do............................. | Red. |
| 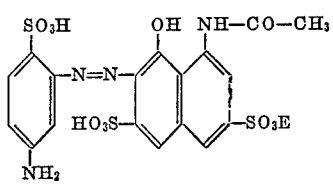 | ......do............................. | Red. |
| 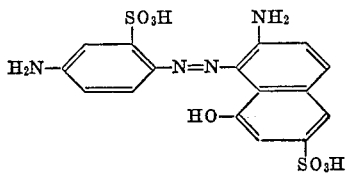 | 3-(N-methyl-β-chloroethyl-sulfonylamino)-benzene-1-carboxylic acid chloride. | Red. |
| 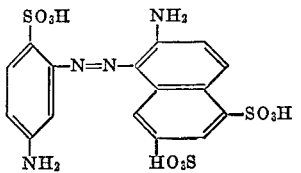 | ......do............................. | Orange. |
| 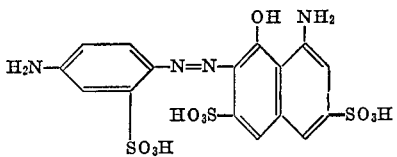 | ......do............................. | Red violet. |
| 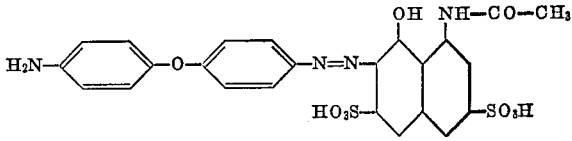 | 4-(N-methyl-β-chloroethylsulfonylamino)-benzene-1-carboxylic acid chloride. | Bluish red. |
| 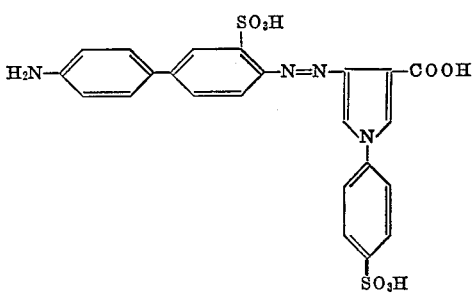 | ......do............................. | Reddish yellow. |

| Aminoazo-dyestuff | Condensing agent | Tint on wool or cotton |
|---|---|---|
| 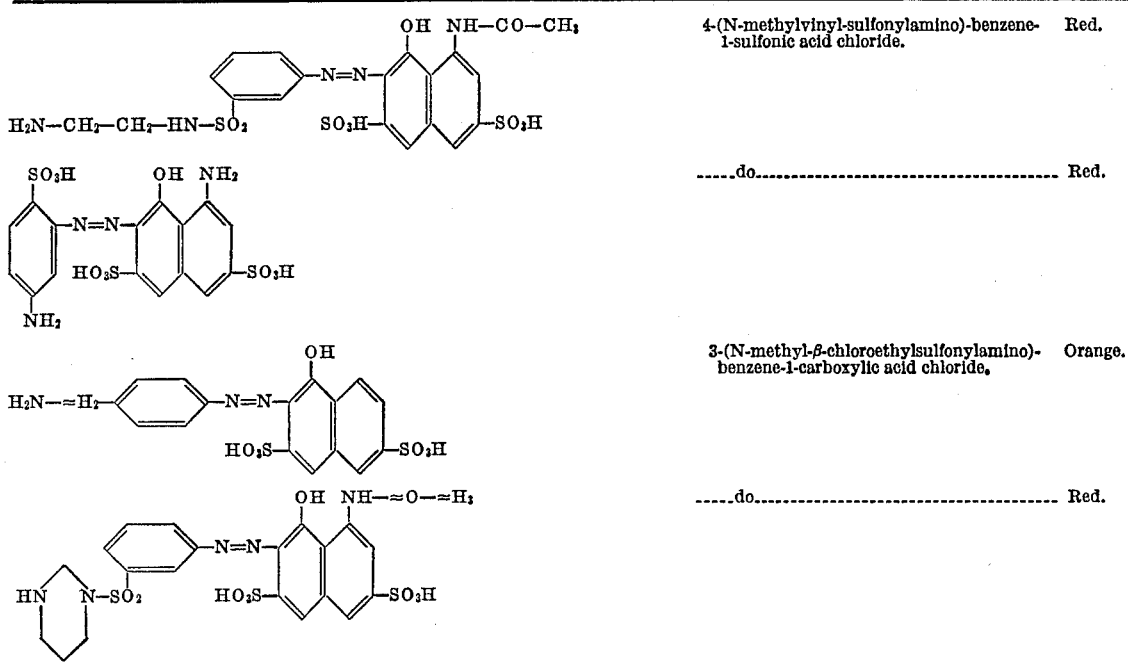 | 4-(N-methylvinyl-sulfonylamino)-benzene-1-sulfonic acid chloride. | Red. |
| | ....do.............................................. | Red. |
| | 3-(N-methyl-β-chloroethylsulfonylamino)-benzene-1-carboxylic acid chloride. | Orange. |
| | ....do.............................................. | Red. |

Example 8

50.2 parts by weight of the monoazo-dyestuff of the formula

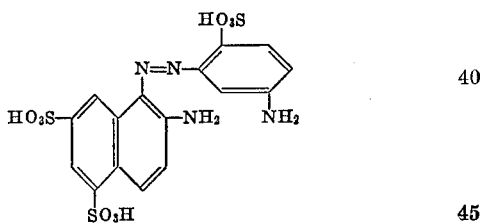

(prepared by coupling diazotized 1-amino-3-acetylamino-benzene-6-sulfonic acid with 2-aminonaphthalene-5,7-disulfonic acid and alkaline saponification of the acetylamino group) in form of the sodium salt are dissolved in 1300 parts by volume of water at a pH-value of 7. To this solution, there are added 32.6 parts by weight of finely pulverized 4 - (N - methyl-β-chloroethylsulfonylamino)-benzene-1-carboxylic acid chloride and the mixture is stirred for 20 hours at 10° to 15° C. The hydrochloric acid formed is neutralized by dropwise addition of 2 N sodium carbonate solution in a manner such that the pH-value is kept constantly at 6. When the condensation is terminated, the dyestuff formed having the formula

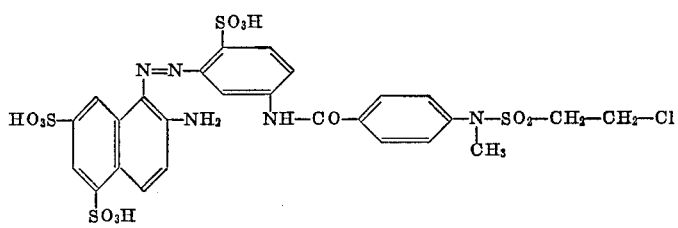

is salted out with sodium chloride, isolated and dried at 50° C. An orange powder is obtained which dyes cotton wash-fast yellowish orange shades.

Example 9

69.4 parts by weight of the aminomonoazo-dyestuff of the formula

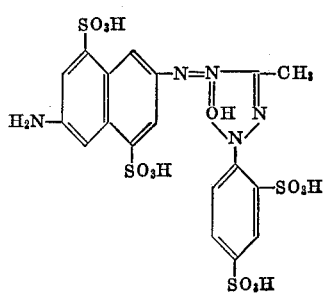

prepared by coupling diazotized 2-amino-6-nitronaphthalene-4,8-disulfonic acid with 1-(2',4'-disulfophenyl)-3-methyl-5-pyrazolone and subsequent reduction of the nitro group, are dissolved in 800 parts by volume of water with the addition of dilute sodium hydroxide solution so that a neutral aqueous solution of the dyestuff is obtained. Into this solution, there are introduced dropwise, while stirring intensely, in the course of 1½ hours, at 0° to 2° C., a solution of 36 parts by weight of 4-(N-methylvinylsulfonylamino)-benzene-1-isocyanate (boiling point at a pressure of 0.33–0.37 mm. Hg: 154.5–159.5° C., melting point: 51–51.5° C.) in 60 parts by volume of acetone. The mixture is further stirred for 2 hours at 0° to 2° C. and then combined with potassium chloride.

The precipitated dyestuff is isolated by filtration, washed with dilute potassium chloride solution and dried at 50° C. in a vacuum. A brown orange powder is obtained which dissolves in water to give a yellow orange solution. In the presence of sodium bicarbonate, the new dyestuff gives a full golden yellow print on cotton which has a good fastness to washing.

When using instead of 36 parts by weight of 4-(N-methylvinylsulfonylamino) - benzene - 1 - isocyanate the same amount by weight of 3-(N-methylvinylsulfonylamino)-benzene-1-isocyanate (boiling point at a pressure of 0.1 mm. Hg: 144–145.5° C.; melting point: 58.5–59.3° C.), a dyestuff having similar properties is obtained.

Example 10

35 parts by weight of 2-amino-6-nitronaphthalene-4,8-disulfonic acid are dissolved in 200 parts by volume of water with the addition of dilute aqueous sodium carbonate solution so that a neutral aqueous solution of the dyestuff is obtained and the whole is combined with 25 parts by volume of 4-N-sodium nitrite solution. The solution so obtained is introduced dropwise, at 5° to 10° C., into a mixture of 30 parts by volume of concentrated hydrochloric acid and 30 parts by volume of water, and, after completed diazotization, neutralized with sodium carbonate. The suspension of the diazonium salt is then combined with a solution of 33 parts by weight of 1-(2′,5′-disulfophenyl)-3-methyl-5-pyrazolone and 50 parts by weight of sodium carbonate in 385 parts by volume of water and stirred at 20° C. until coupling is complete. The mixture is then heated to 80° C. and combined with 40 parts by weight of crystallized sodium sulfide. After 40 minutes, the nitro group of the monoazo-dyestuff is reduced to an amino group. The mixture is cooled to room temperature, then neutralized with dilute hydrochloric acid and combined with sodium chloride. The precipitated dyestuff is filtered off and washed with an aqueous sodium chloride solution. The dyestuff is dissolved in 850 parts by volume of water. Into this solution, there are introduced dropwise, at 0° to 5° C., a solution of 35.4 parts by weight of 4-(β-chloroethylsulfonylamino)-benzene-1-carboxylic acid chloride (melting point 133° to 135° C.) in 50 parts by volume of acetone and, simultaneously, an aqueous sodium bicarbonate solution (having a strength of 10% by weight) in such a manner that the pH value is kept at 6.0 to 6.5. As soon as the condensation is complete, the dyestuff of the formula

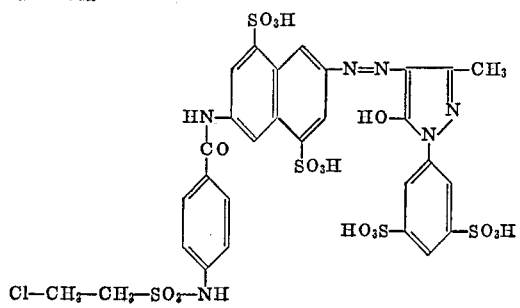

is salted out with potassium chloride, filtered off, washed with potassuim chloride solution and dried at 60° C. An orange powder is obtained which dissolves in water to give an orange solution.

A cotton fabric is printed with the new dyestuff according to the method described in Example 1. The printed fabric is then heated for 5 to 10 minutes at 140° to 150° C. and aftertreated as described in Example 1. A yellowish orange print is obtained which has a very good fastness to washing.

When using instead of 35.4 parts by weight of 4-(β-chloroethylsulfonylamino) - benzene - 1 - carboxylic acid chloride the same amount by weight of 3-(β-chloroethylsulfonylamino)-benzene-1-carboxylic acid chloride (melting point 83° to 85° C.), a dyestuff having similar properties is obtained.

Example 11

35 parts by weight of 2-amino-6-nitronaphthalene-4,8-disulfonic acid are diazotized in the usual manner and coupled with 26 parts by weight of 1-(4′-sulfophenyl)-3-methyl-5-pyrazolone. The monoazo-dyestuff obtained is dissolved in 500 parts by volume of water at 80° C. 40 parts by weight of crystallized sodium sulfide are then introduced into this solution. As soon as the reduction is complete, the whole is cooled to 20° C., acidified with dilute hydrochloric acid and combined with sodium chloride. The precipitated aminomonoazo-dyestuff is filtered off, washed with an aqueous sodium chloride solution and dissolved in 500 parts by volume of water with the addition of dilute sodium hydroxide solution so that a neutral aqueous solution of the dyestuff is obtained. Into this solution, there are introduced dropwise, at 0° to 5° C., a solution of 36 parts by weight of 4-(N-methyl-β-chloroethylsulfonylamino)-benzene-1-carboxylic acid chloride in 50 parts by volume of acetone and, simultaneously, a dilute sodium carbonate solution, in such a manner that the pH value is kept at 6.0 to 6.5. When the condensation is complete, the pH value is adjusted to 2 by adding dilute hydrochloric acid and the suspension obtained is combined with potassium chloride. The precipitated product is filtered off and washed with a dilute potassium chloride solution. The new dyestuff of the formula

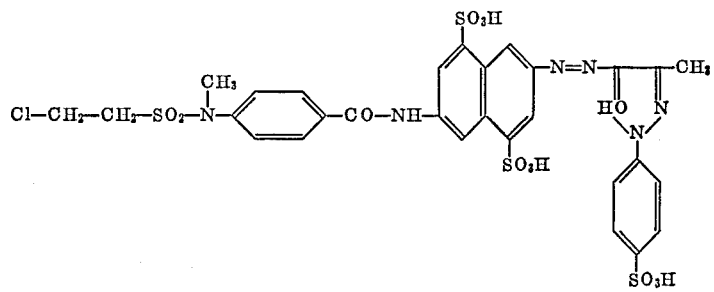

dyes cotton wash-fast golden yellow shades when applied according to the method described in Example 2. When using in the above example, instead of the mentioned aminoazo-dyestuff, corresponding parts by weight of the aminoazo-dyestuffs listed in the following table, there are obtained dyestuffs which, when applied according to the dyeing or printing process described above, give dyeings on cellulose that have equally good fastness to wet processing. In the table, the term "saponified" means that one acetylamino group in the dyestuff molecule is converted into a condensable amino group by acid or alkaline saponification. The term "reduced" means that a nitro group contained in the diazo component is converted by reduction into an amino group after the preparation of the nitro-azo-dyestuff.

| Diazo component | Azo component | Tint on cotton |
| --- | --- | --- |
| 2-amino-6-nitronaphthalene-4,8-di-sulfonic acid (reduced). | 1-(2'-methyl-4',5' disulfophenyl)-3-carboxy-5-pyrazolone. | Reddish yellow. |
| Do | 1-(2',5'-disulfophenyl)-3-methyl-5-pyrazolone. | Golden yellow. |
| Do | 1-(2',5'-dichloro-4'-sulfophenyl)-3-methyl-5-pyrazolone. | Reddish yellow. |
| Do | 1-(4'-sulfophenyl)-3-carboxy-5-pyrazolone. | Golden yellow. |
| Do | 1-hydroxy-naphthalene-3,6-isulfonic acid. | Red. |
| Do | 2-hydroxynaphthalene 3,6-di-sulfonic acid. | Red. |
| 1-amino-4-nitrobenzene-2-sulfonic acid (reduced). | 1-(4'-sulfophenyl)-3-carboxy-5-pyrazolone. | Reddish yellow. |
| Do | 1-(3'-sulfophenyl)-3-methyl-5-amino-pyrazole. | Yellow. |
| 1-amino-3-acetylamino benzene-6-sulfonic acid (saponified). | 1-(4'-sulfophenyl)-3-carboxy-5-pyrazolone. | Do. |
| 1-amino-5-acetylamino-naphthalene-3,7-disulfonic acid (saponified). | 1-(4'-sulfophenyl)-3-carboxy-5-pyrazolone. | Reddish yellow. |
| 1-aminobenzene-2,4-disulfonic acid | 2-acetylamino-5-naphthol-7-sulfonic acid (saponified). | Orange. |
| 4-aminoazobenzene-3,4'-disulfonic acid. | 1-amino-3-acetyl-amino-benzene. | Yellow orange. |

Example 12

63 parts by weight of the aminomonoazo-dyestuff of the formula indicated in Example 5 are dissolved with the addition of sodium hydroxide solution in 1200 parts by volume of water at a pH value of 6.5 to 7.0. Into this solution, there are introduced, while stirring intensely, at 0° to 5° C., 32.6 parts by weight of finely pulverized 4 - (N - methyl - β - chloroethylsulfonylamino)-benzene-1-carboxylic acid chloride in solid form or dissolved in 50 parts by volume of acetone or 100 parts by volume of chloroform. Simultaneously, an aqueous solution of sodium carbonate is added dropwise in such a manner that the reaction is always neutral. As soon as the condensation is terminated, the dyestuff having the formula

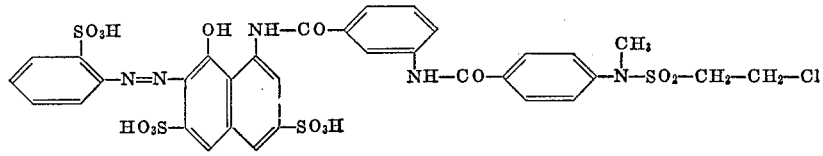

is salted out by adding sodium chloride, filtered off, washed with a sodium chloride solution and dried in a vacuum. The new dyestuff constitutes a dark powder which dissolves in water to give a bluish red solution and dyes cotton in the presence of sodium carbonate bluish red shades which have good fastness to washing.

Dyestuffs that have similar properties are obtained, when using instead of 32.6 parts by weight of 4-(N-methyl - β - chloroethylsulfonylamino) - benzene - 1 - carboxylic acid chloride, corresponding parts by weight of the acylating agents listed in the following table.

Condensing agents 4-(N-β-chloroethyl-β'-chloroethylsulfonylamino)-benzene-1-carboxylic acid chloride 2-(β-chloroethylsulfonylamino)-benzene-1-carboxylic acid chloride (melting point 83° to 85° C.)

2-(N-ethyl-β-chloroethylsulfonylamino)-benzene-1-carboxylic acid chloride 4-(N-methyl-β-chloroethylsulfonylamino)-2,5-dimethyl-benzene-1-isocyanate 4-(N-methyl-β-acetoxyethylsulfonylamino)-benzene-1-carboxylic acid chloride (boiling point at a pressure of 0.3 mm. Hg.: 206° to 209° C.)

4-(N-methyl-β-phenoxyethylsulfonylamino)-benzene-1-carboxylic acid chloride 4-(N-methyl-β-pyridinium chloride-ethylsulfonylamino)-benzene-1-carboxylic acid chloride 4-(N-methyl-β-trimethylammonium chloride-ethylsulfonylamino)-benzene-1-carboxylic acid chloride

Example 13

26.2 parts by weight of the disodium salt of 4-(4''-aminophenyl) - amino - 2' - nitrodiphenylamino - 3,4' - disulfonic acid are dissolved in 765 parts by volume of water. To this solution, there are added dropwise, at 0° to 5° C., in the course of 3 hours, while stirring intensely, a solution of 17.7 parts by weight of 4-(N-methyl-β-chloroethylsulfonylamino) - benzene - 1 - carboxylic acid chloride in 55 parts by volume of chloroform and, simultaneously, a 2 N sodium carbonate solution in such a manner that the pH-value is kept at 6.8 to 7.0. The mixture is further stirred for 20 hours while controlling the pH-value and then the chloroform is removed by distillation. The dyestuff is filtered at 80° C. with addition of 5 parts by weight of charcoal and 10 parts by weight of kieselguhr and combined at 20° C. with sodium chloride.

The precipitated nitro-dyestuff of the formula

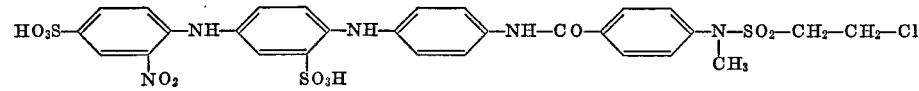

is then filtered off and dried. It constitutes a dark powder which dissolves in water to give a violet brown solution. When dyeing according to the direct dyeing method in the presence of sodium carbonate, full brown violet shades are obtained on cotton that have a good fastness to washing.

Example 14

63.6 parts by weight of the aminodisazo-dyestuff of the following formula

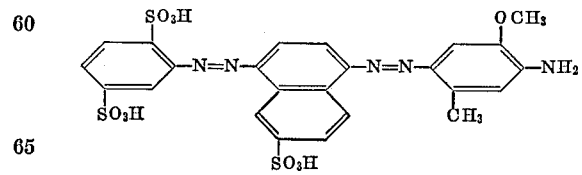

prepared by coupling diazotized 1-aminobenzene-2,5-disulfonic acid with 1-aminonaphthalene-6-sulfonic acid, diazotizing the aminomonoazo-dyestuff obtained and coupling with 1-amino-2-methoxy-5-methylbenzene, are dissolved in 2000 parts by volume of water with the addition of dilute sodium hydroxide solution so that a neutral solution of the dyestuff is obtained. Into this solution, there are introduced dropwise, while stirring intensely, at 0° to 5° C., a solution of 36 parts by weight of 4-(N-methyl-β-chloroethylsulfonylamino)-benzene-1-carboxylic acid chloride and, simultaneously, a dilute aqueous sodium carbonate solution in such a manner that the pH-value is kept at 6.5 to 6.9. As soon as the condensation is complete, 3 parts by weight of animal charcoal and 10 parts by weight of kieselguhr are added and the whole is stirred for 5 minutes at 85° C. and then filtered. The dyestuff is salted out with sodium chloride from the cooled filtrate, filtered, washed with a dilute sodium chloride solution and dried. A dark powder is obtained which dissolves in water to give a brown solution.

In the presence of acid-binding agents, the new dystuff gives on cotton yellowish brown dyeings and prints which are fast to washing.

Example 15

76.6 parts by weight of the aminodisazo-dyestuff of the formula

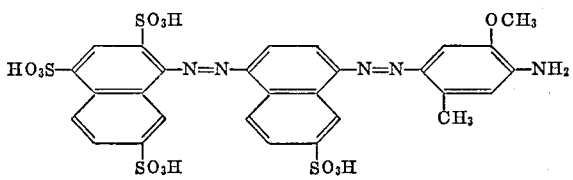

obtained by coupling diazotized 1-aminonaphthalene-2,4,7-trisulfonic acid with 1-aminonaphthalene-7-sulfonic acid, diazotizing again the aminomonoazo-dyestuff obtained and coupling with 1-amino-2-methoxy-5-methylbenzene, are dissolved in 850 parts by volume of water with the addition of dilute sodium hydroxide solution so that a neutral solution of the dyestuff is obtained. This aminodisazo-dyestuff is then condensed as described in Example 21 with 4-(N-methyl-β-chloroethylsulfonylamino)-benzene-1-carboxylic acid and further treated as indicated in the aforesaid example. A dark powder is obtained which dissolves easily in water to give a brown solution.

When used according to the printing method described in Example 1, the new dyestuff gives a brown print that has a good fastness to washing and to light.

Example 16

42 parts by weight of the dyestuff of the formula

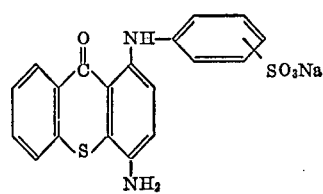

are dissolved in 1850 parts by volume of water. To the solution obtained, there are added dropwise, while stirring intensely, 37 parts by weight of 4-(N-methyl-β-acetoxyethylsulfonylamino)-benzene-1-carboxylic acid chloride (boiling point at a pressure of 0.3 mm. Hg: 206° to 209° C.) and, simultaneously, dilute sodium hydroxide solution in such a manner that the reaction of the mixture is constantly kept in the neutral to weakly acid range. The mixture is stirred while continuously controlling the pH-value, until the condensation is terminated. The dyestuff is isolated in the usual manner and dried. A yellow powder is obtained which dissolves in water to give a yellow solution.

We claim:
1. An azo dyestuff of the formula

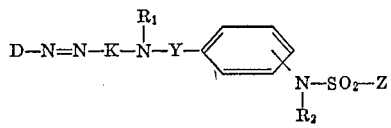

wherein D represents disulfobenzene, mono-sulfo-monocarboxybenzene,

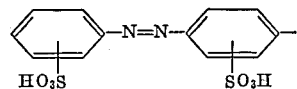

disulfonaphthalene, trisulfonaphthalene,

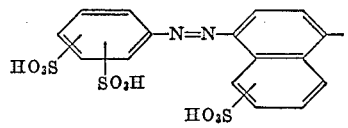

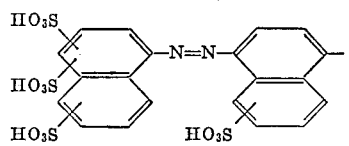

or

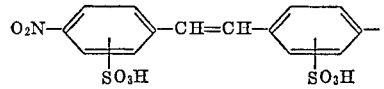

K represents benzene, mono-lower alkyl benzene, di-lower alkyl benzene, mono-lower alkoxy benzene, di-lower alkoxy benzene, mono-lower alkyl-mono-lower alkoxybenzene, mono-acetylaminobenzene or mono-chlorobenzene, $R_1$ represents hydrogen or lower alkyl, $R_2$ represents lower alkyl, Y represents —CO—, —SO— or —CO—NH—, Z represents —CH=$CH_2$, —$CH_2$—$CH_2$—Cl —$CH_2$—$CH_2$—O—CO—$CH_3$, —$CH_2$—$CH_2$—O—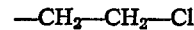

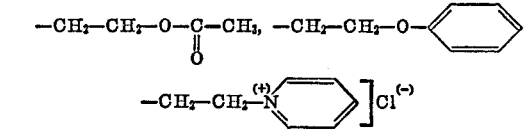

or

2. The dyestuff of the formula

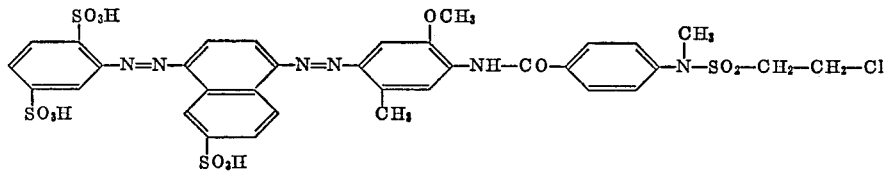

3. The dyestuff of the formula

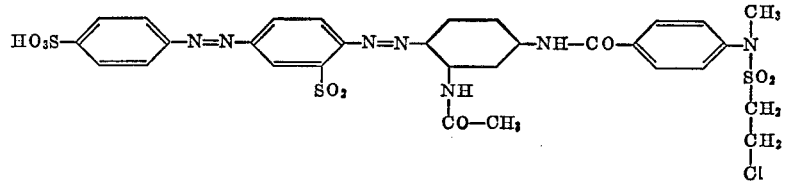

4. The dyestuff of the formula
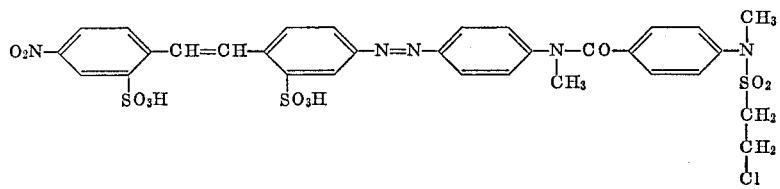
5. The dyestuff of the formula
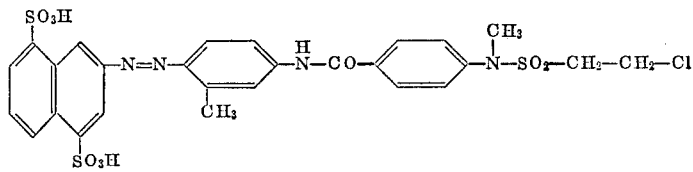
6. The dyestuff of the formula
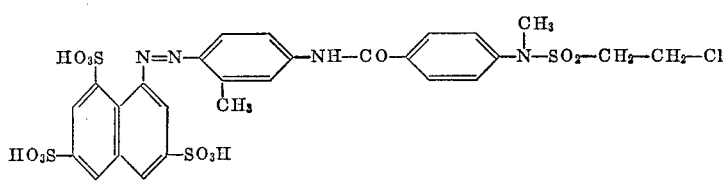
References Cited
UNITED STATES PATENTS
2,128,255   8/1938   Krzikalla et al. ____ 260—150 X
3,135,730   6/1964   Heyna et al. _____ 260—147
FOREIGN PATENTS
875,946   8/1961   Great Britain.
CHARLES B. PARKER, *Primary Examiner.*
DONALD M. PAPUGA, *Assistant Examiner.*
U.S. Cl. X.R.
8—41, 26, 55, 51, 13; 260—205, 206, 207, 207.1, 156, 190, 191, 196, 153, 37, 194, 158, 198, 199, 163, 162, 200, 201, 195, 154, 556, 329.3, 507